(12) United States Patent
Wang et al.

(10) Patent No.: US 10,636,637 B2
(45) Date of Patent: Apr. 28, 2020

(54) SYSTEMS AND METHODS TO PROCESS AND GROUP CHROMATOGRAPHIC PEAKS

(71) Applicant: LECO Corporation, St. Joseph, MI (US)

(72) Inventors: Jihong Wang, St. Joseph, MI (US); Peter Markel Willis, Benton Harbor, MI (US)

(73) Assignee: LECO Corporation, St. Joseph, MI (US)

( * ) Notice: Subject to any disclaimer, the term of this patent is extended or adjusted under 35 U.S.C. 154(b) by 0 days.

(21) Appl. No.: 15/860,417

(22) Filed: Jan. 2, 2018

(65) Prior Publication Data

US 2018/0122626 A1    May 3, 2018

Related U.S. Application Data

(63) Continuation of application No. 14/371,554, filed as application No. PCT/US2013/021685 on Jan. 16, 2013, now abandoned.

(60) Provisional application No. 61/587,025, filed on Jan. 16, 2012.

(51) Int. Cl.
*H01J 49/00* (2006.01)
*G01N 30/86* (2006.01)
*G06F 17/18* (2006.01)

(52) U.S. Cl.
CPC ...... *H01J 49/0036* (2013.01); *G01N 30/8624* (2013.01); *G06F 17/18* (2013.01); *G01N 2030/862* (2013.01)

(58) Field of Classification Search
None
See application file for complete search history.

(56) References Cited

U.S. PATENT DOCUMENTS

| 7,501,621 | B2 | 3/2009 | Willis et al. | |
| 7,825,373 | B2 | 11/2010 | Willis et al. | |
| 7,884,319 | B2 | 2/2011 | Willis et al. | |
| 2006/0080040 | A1* | 4/2006 | Garczarek | G01N 30/8624 702/19 |
| 2009/0318556 | A1* | 12/2009 | Idle | A61K 31/195 514/562 |
| 2014/0088923 | A1* | 3/2014 | Wang | G01N 30/8675 702/191 |
| 2015/0051843 | A1* | 2/2015 | Wang | G01N 30/8644 702/23 |

OTHER PUBLICATIONS

English machine translation (by Google Patents) of Chinese Patent Document CN1588050A, by Wang et al., published 2005 (Year: 2005).*
U.S. Appl. No. 61/451,952, Wang.
U.S. Appl. No. 61/445,674, Jaloszynski et al.
Non-Final Office Action dated Jun. 30, 2017, relating to U.S. Appl. No. 14/371,554.

* cited by examiner

*Primary Examiner* — David M. Gray
*Assistant Examiner* — Geoffrey T Evans
(74) *Attorney, Agent, or Firm* — Honigman LLP

(57) ABSTRACT

A method for processing chromatographic peaks in chromatographic systems comprising comparing a first peak with a second peak; and determining whether the first peak and second peak should be grouped together.

14 Claims, 2 Drawing Sheets

SYSTEMS AND METHODS TO PROCESS AND GROUP CHROMATOGRAPHIC PEAKS

TECHNICAL FIELD

This disclosure relates to data processing techniques for data obtained in chromatographic mass spectrometry systems.

BACKGROUND

It is known that chromatographic mass spectrometers produce large amounts of data. Systems and methods have previously been introduced to analyze such data to differentiate relevant information from noise such as those systems described in U.S. Provisional Patent Application No. 61/451,952

SUMMARY

A system and method for processing chromatographic peaks in chromatographic systems is described. In an implementation, the system and method includes comparing a first peak with a second peak and determining whether the first peak and second peak should be grouped together.

DESCRIPTION OF DRAWINGS

Like reference symbols in the various drawings indicate like elements.

DETAILED DESCRIPTION

It is to be appreciated that this method may be used in all types of chromatography systems, including liquid and gas. In an implementation, data is supplied for analysis by a data acquisition system associated with a mass spectrometer. For purposes of this disclosure, it is to be understood that the data acquisition may be a system as set forth in U.S. Pat. Nos. 7,501,621, 7,825,373, 7,884,319.

Further, prior to undergoing such analysis the data from the data acquisition system may be adjusted as set forth in U.S. Provisional Patent Application Ser. No. 61/445,674. The foregoing, and all other referenced patents and applications are incorporated herein by reference in their entirety. Where a definition or use of a term in an incorporated reference is inconsistent or contrary to the definition of that term provided herein, the definition of that term provided herein applies and the definition of that term in the reference does not apply.

Figure 1:
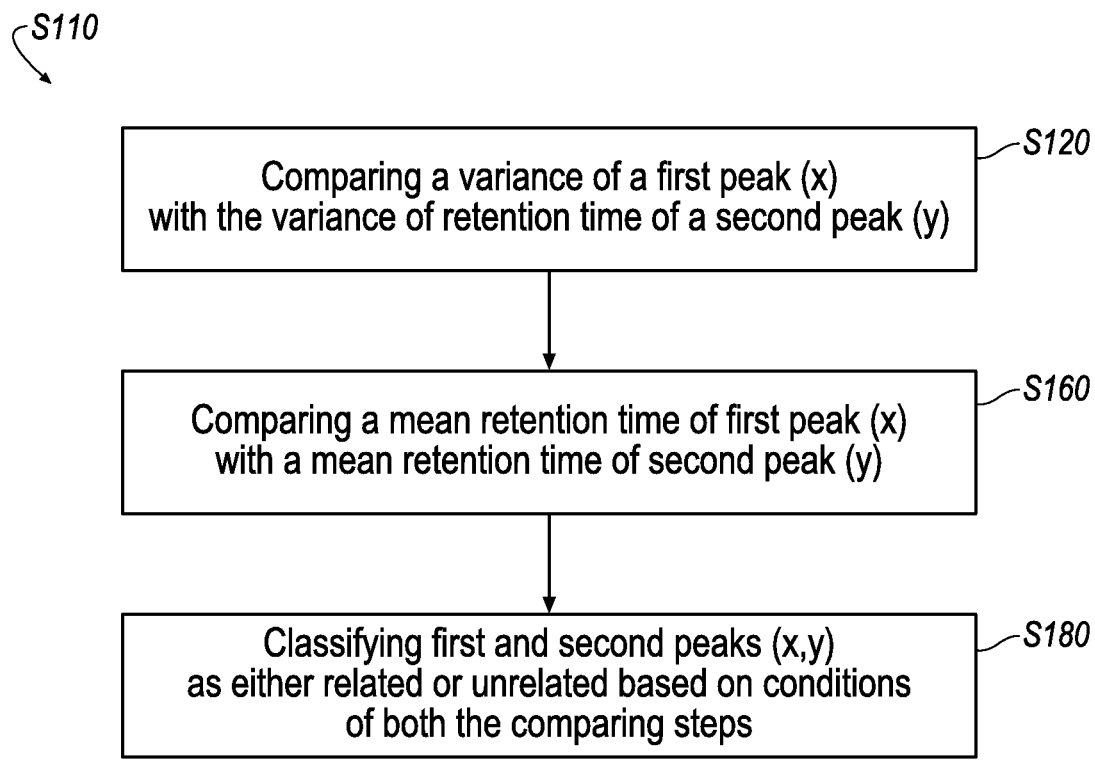
FIG. 1 depicts a general process relating to peak grouping, according to an implementation that is described in this disclosure.

Referring to FIG. 1, an exemplary method is disclosed for peak grouping and identification, namely identifying discrete peaks within a data set and identifying the spectrum of each identified discrete peak. As may be appreciated, the proper identification of such peaks may facilitate more efficient processes in later data analysis steps.

In an implementation using the disclosed methods and processes, ion statistics are the dominant source of variance in the signal. Accomplishing ion statistics as the dominant source may be facilitated by using an ultra-high resolution mass spectrometer that generally suppresses electrical noise from within the signal. Often, based on the systems, most of the mass spectral interferences within such systems can be automatically resolved due to the high resolution quality of the instrument. In turn, this yields a significant avoidance of outside mass spectral interferences and, if there are shared masses, such system may do a deconvolution.

To utilize embodiments of the methods discussed herein, the number of ions are present within an analyzed signal are known. In the examples discussed herein, the volumes of ions in the analyzed signals were known and the acquisition method is adapted to remove most of the electrical noise. For example, and among other possibilities, noise from the signal was removed using the data acquisition system described in U.S. Pat. Nos. 7,501,621, 7,825,373, 7,884,319.

For purposes of this disclosure, illustrations using a first peak (x) and a second peak (y) will be discussed, each having a size (m) by 1. The nomenclature in this paper will ascribe the following variables to the first and second peaks (x, y).

x: column vector of the chromatographic peak of the base peak;
$x_i$: scalar of the i-th element of x;
y: column vector of the chromatographic peak to examine for merge with x;
$y_i$: scalar of the i-th element of y;
$t_i$: scalar of the retention time of the i-th location;
m: scalar of the length of x and y;
$n_{px}$: scalar of the number of ions in peak x;
$n_{py}$: scalar of the number of ions in peak y;
α: scalar of the significance level;
$mean_{px}$: scalar of mean of peak x;
$mean_{py}$: scalar of mean of peak y;
$\sigma_{px}$: scalar of standard deviation of peak x;
$\sigma_{py}$: scalar of standard deviation of peak y;
$s_{px}$: scalar of estimation of standard deviation of peak x;
$s_{py}$: scalar of estimation of standard deviation of peak y; and
$r_{xy}$: scalar of the correlation coefficient of vector x and y.

Referring to FIG. 1, in an implementation, a method of grouping and identifying peaks includes comparing first peak (x) at S110 with second peak and determining whether first peak and second peak (x, y) should be grouped together at S160.

For purposes of this disclosure, it is to be appreciated that the referenced peaks are considered to be probability distributions of ions with a mean and standard deviation as the ion statistics are substantially dominant, the noise is generally eliminated and the ion volume is known. In an implementation, the comparing step S110 may include comparing a mean retention time of first peak (x) with a mean retention time of second peak (y) at 120, comparing the variance of the first peak (x) with the variance of the second peak (y) at S160, and classifying first and second peaks (x,y) as either related or unrelated based on conditions of both the comparing steps S180. Further, in an implementation, the first and second peaks (x,y) are classified as related if both (a) the mean retention times of first peak and second peak are substantially the same and (b) the variances of first peak and second peak are substantially the same.

Figure 2:
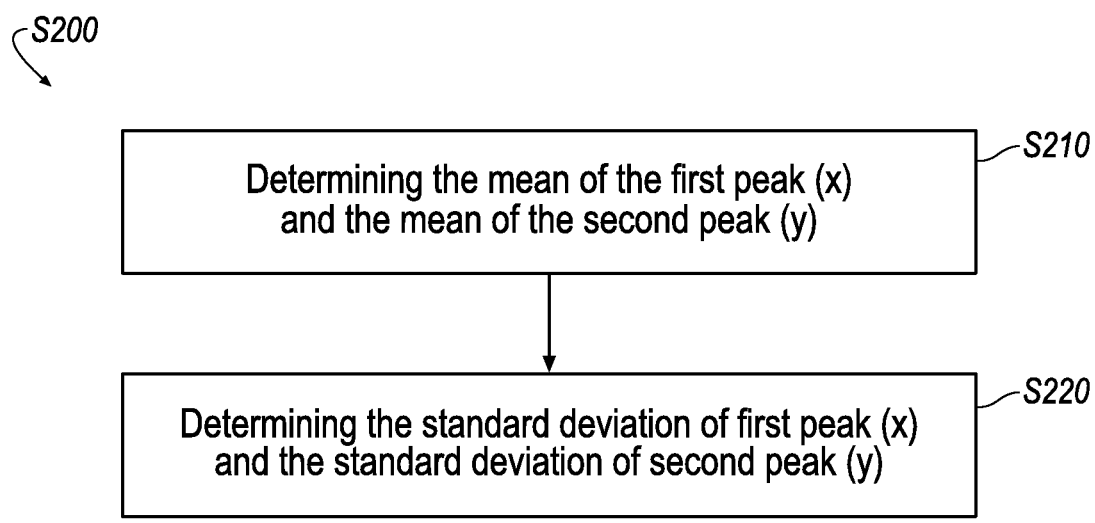
FIG. 2 depicts an exemplary method for determining peak means and peak standard deviations, according to an implementation.

FIG. 2 depicts an exemplary method for determining peak means and peak standard deviations which may be used in a later. As illustrated, the mean of the first peak (x) and the mean of the second peak (y) is determined at S210. In an implementation, the means are determined in accordance with the following equations:

$$\text{mean}_{px} = \frac{\sum_{i=1}^{m} x_i t_i}{\sum_{i=1}^{m} x_i} \times \frac{n_{px}}{n_{px} - 1}$$

$$\text{mean}_{py} = \frac{\sum_{i=1}^{m} y_i t_i}{\sum_{i=1}^{m} y_i} \times \frac{n_{py}}{n_{py} - 1}$$

With continued reference to FIG. 2, the standard deviation of first peak (x) and the standard deviation of second peak (y) is determined at S220. These peak standard deviations may be determined as set forth in the following equations:

$$s_{px} = \sqrt{\frac{\sum_{i=1}^{m} x_i (t_i - \text{mean}_{px})^2}{\sum_{i=1}^{m} x_i} \times \frac{n_{px}}{n_{px} - 1}}$$

$$s_{py} = \sqrt{\frac{\sum_{i=1}^{m} y_i (t_i - \text{mean}_{py})^2}{\sum_{i=1}^{m} y_i} \times \frac{n_{py}}{n_{py} - 1}}$$

It is to be appreciated that other methods may be used to determine peak mean and peak standard deviation other than the examples set forth herein. For example, and among others, in the case of peaks having normal (e.g., Gaussian) distributions that have high intensity and a generally smooth ion probability density function (PDF), the peak mean can be estimated as the apex location and the peak standard deviation can be related to the signal full width at half maximum (FWHM). But it is further to be appreciated, that the apex/FWHM associations may not be applicable in the case of low intensity peaks as the bias can be large between the peak mean and the apex location. Alternately, various smoothing may be applied to the peaks to minimize the bias between the apex and mean as well as between the FWHM and standard deviation.

In an implementation and as referenced, the comparing a mean retention time of first peak (x) with a mean retention time of second peak (y) (S120) is referred to as the t-hypothesis. The t-hypothesis may be employed to test if the means of the retention times of first peak (x) and second peak (y) are substantially the same such that the confidence interval therebetween potentially warrants the grouping of first peak (x) with second peak (y).

Figure 3:
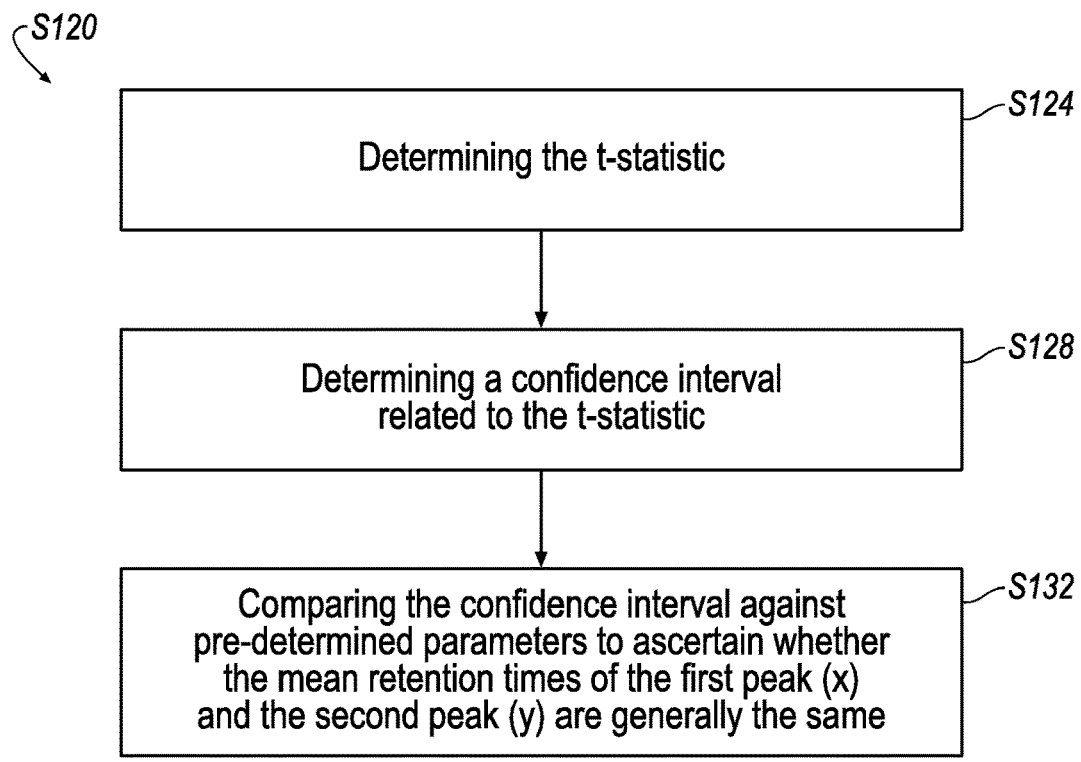
FIG. 3 depicts an exemplary method for determining whether the mean retention times of a first peak and a second peak are substantially the same, according to an implementation.

With reference now to FIG. 3, an implementation to compare the mean retention time of first peak (x) with the mean retention time of second peak (y) is disclosed. First, for a given confidence interval, a t-statistic is determined in accordance with the following equation at step S124:

$$t = \frac{\text{mean}_{px} - \text{mean}_{py}}{\sqrt{\frac{(n_{px} - 1)s_{px}^2 + (n_{py} - 1)s_{py}^2}{n_{px} + n_{py} - 2}} \sqrt{\frac{1}{n_{px}} + \frac{1}{n_{py}}}}$$

In an implementation, a confidence interval may be used to broaden the t-statistic at S128 of which the following equation is but an example to ascribe such a confidence interval:

$$\left[ -t_{\frac{\alpha}{2}}(n_{px} + n_{py} - 2), t_{\frac{\alpha}{2}}(n_{px} + n_{py} - 2) \right]$$

At S132, the means of the retention times of first peak (x) and second peak (y) are substantially the same such that the confidence interval therebetween potentially warrants the grouping of first peak (x) with second peak (y) if:

$$-t_{\frac{\alpha}{2}}(n_{px} + n_{py} - 2) \le t \le t_{\frac{\alpha}{2}}(n_{px} + n_{py} - 2)$$

In an implementation and as referenced for the remainder of this disclosure, the comparing a variance of first peak (x) with a variance of second peak (y) (S160) is referred to as the F-hypothesis. In an implementation, the F-hypothesis is employed to test if the variances in—first peak (x) and second peak (y) are substantially the same such that the confidence interval therebetween potentially warrants the grouping of first peak (x) with second peak (y).

Figure 4:
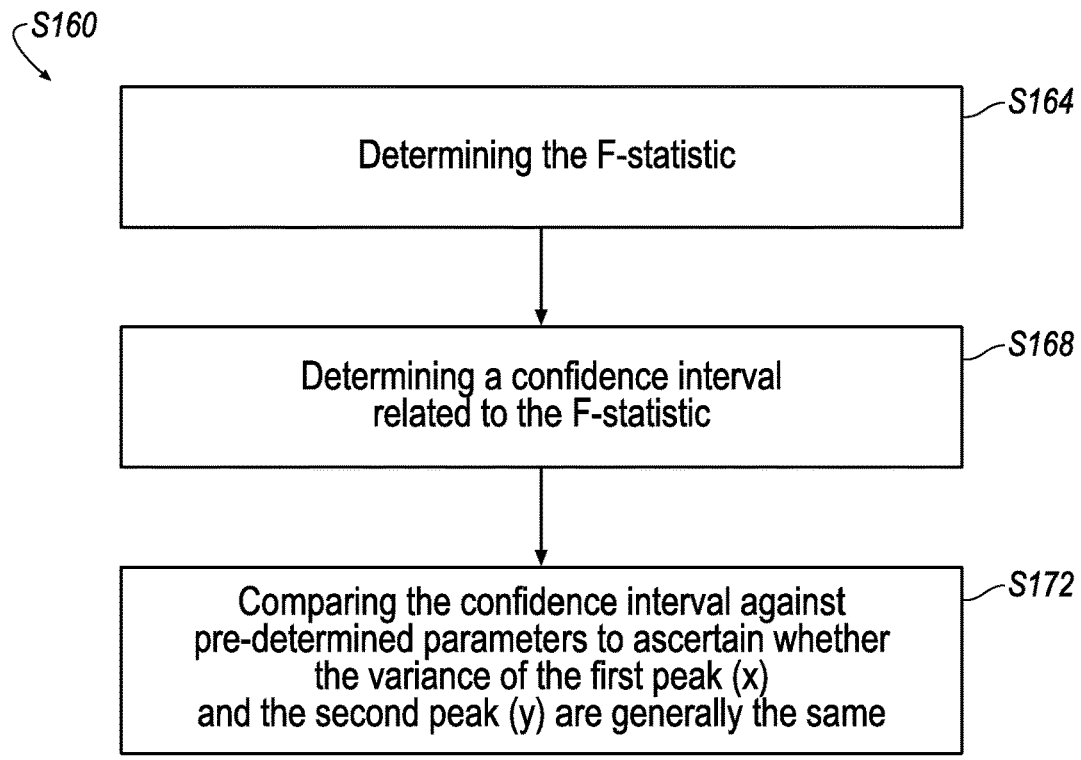
FIG. 4 depicts an exemplary method for determining whether the variance of a first peak and a second peak are substantially the same, according to an implementation.

With reference now to FIG. 4, an implementation to compare the variance of first peak (x) with the variance of the second peak (y) is disclosed. First, for a given significance level, an F-statistic is determined in accordance with the following equation at step S164:

$$F = \frac{s_{px}^2}{s_{py}^2}$$

In an implementation, a confidence interval may be used to broaden the value at S168 of which the following equation is but an example to ascribe such a confidence interval:

$$\left[ F\left(1 - \frac{\alpha}{2}, n_{px} - 1, n_{py} - 1\right), F\left(\frac{\alpha}{2}, n_{px} - 1, n_{py} - 1\right) \right]$$

At S172, the variances of first peak (x) and second peak (y) are substantially the same such that the confidence interval therebetween potentially warrants the grouping of first peak (x) with second peak (y) if:

$$F\left(1 - \frac{\alpha}{2}, n_{px} - 1, n_{py} - 1\right) \le F \le F\left(\frac{\alpha}{2}, n_{px} - 1, n_{py} - 1\right).$$

In a large size data set, it may be too lethargic from processing standpoint to calculate an F-statistic between peaks every time. In an implementation, an alternative method of determining the F-statistic that may help to speed up the process includes storing pre-determined F-statistic values within the system pre-determined F-statistic values are pre-calculated using singular value decomposition and stored within memory of the system. In an embodiment, the table stored within memory may include the following F-statistic information:

$$Ftable_{1-\frac{\alpha}{2}}(i, j) = F\left(1 - \frac{\alpha}{2}, i, j\right), \text{ where } i = 1, \ldots, 1000; j = 1, \ldots, 1000$$

In an implementation, the table may further be decomposed by implementing a singular value decomposition on the pre-calculated F-statistics as follows:

$$Ftable_{1-\frac{\alpha}{2}}(i, j) = \sum_{p=1}^{3} u_{ip} \Lambda_{pp} v_{jp} \text{ or}$$

$$Ftable_{1-\frac{\alpha}{2}}(i, j) = \sum_{p=1}^{3} FtableX_{ip} FtableY_{jp}$$

Accordingly, the decomposed table will store six-thousand (6000) values rather than one-million (1,000,000) thereby reducing memory requirements and increasing calculation speed as only FtableX and FtableY Additionally, Ftable(i,j) can be reconstructed by the above equation.

Two tables may be used to calculate two-side tails F-statistics of $\alpha/2$ and $1-\alpha/2$. For the case of freedom greater than 1000, the value 1000 is used when reconstruct F-statistic:

$$F\left(1 - \frac{\alpha}{2}, n_{px} - 1, n_{py} - 1\right) =$$
$$Ftable_{1-\frac{\alpha}{2}}(\max(n_{px} - 1, 1000), \max(n_{py} - 1, 1000)).$$

$$F\left(\frac{\alpha}{2}, n_{px} - 1, n_{py} - 1\right) = Ftable_{\frac{\alpha}{2}}(\max(n_{px} - 1, 1000), \max(n_{py} - 1, 1000)).$$

It is to be understood that various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Also, although several applications of the systems and methods have been described, it should be recognized that numerous other applications are contemplated. Accordingly, other implementations are within the scope of the following claims.

What is claimed is:

1. A method for processing chromatographic peaks in chromatographic systems comprising:
    comparing a first peak with a second peak based on one or more conditions therebetween; and
    classifying the first and second peaks as either related or unrelated based on the one or more conditions, wherein the comparing step includes the steps of (i) comparing a variance of the first peak with a variance of the second peak; and (ii) comparing a mean retention time of the first peak with a mean retention time of the second peak, and wherein the step of comparing the variance of the first peak with the variance of the second peak comprises the substeps of:
    determining a F-statistic between the first peak and the second peak;
    assigning a F-statistic confidence interval related to a t-statistic;
    comparing the F-statistic confidence interval against a pre-determined t-statistic parameter; and
    based on the step of comparing the F-statistic confidence interval against a pre-determined t-statistic parameter, characterizing the first peak and the second peak as related or unrelated.

2. A method for processing chromatographic peaks in chromatographic systems as set forth in claim 1, wherein the step of comparing the mean retention time of the first peak with the mean retention time of the second peak comprises the sub steps of:
    determining a t-statistic between the first peak and the second peak;
    assigning a t-statistic confidence interval related to an F-statistic;
    comparing the t-statistic confidence interval against a pre-determined F-statistic parameter;

based on the step of comparing the t-statistic confidence interval against a pre-determined t-statistic parameter, characterizing the first peak and the second peak as related or unrelated.

3. A method for processing chromatographic peaks in chromatographic systems as set forth in claim 1, wherein the chromatographic system includes memory having an F-statistic look-up table and wherein the step of determining an F-statistic includes the step of looking-up the F-statistic on the look-up table.

4. A method for processing chromatographic peaks in chromatographic systems as set forth in claim 3, wherein the F-statistic look-up table includes pre-determined F-statistic values that are calculated using singular value decomposition and stored within memory of the system.

5. A method for processing chromatographic peaks in chromatographic systems as set forth in claim 1, wherein the chromatographic system includes memory having an F-statistic look-up table and wherein the step of determining an F-statistic includes the step of looking-up the F-statistic on the look-up table.

6. A method for processing chromatographic peaks in chromatographic systems as set forth in claim 5, wherein the F-statistic look-up table includes pre-determined F-statistic values that are calculated using singular value decomposition and stored within memory of the system.

7. A method for processing chromatographic peaks in chromatographic systems as set forth in claim 1, wherein the first peak is a first probability distributions of ions and the second peak is a second probability distributions of ions.

8. A method for processing chromatographic peaks in chromatographic systems as set forth in claim 1, wherein the comparing step and the classifying step are executed by processing modules.

9. A method for processing chromatographic peaks in chromatographic systems comprising:
comparing a first peak with a second peak based on one more conditions therebetween; and classifying the first and second peaks as either related or unrelated based on the one or more conditions, wherein the comparing step includes the steps of (i) comparing a variance of the first peak with a variance of the second peak; and (ii) comparing a mean retention time of the first peak with a mean retention time of the second peak, and wherein the step of comparing the mean retention time of the first peak with the mean retention time of the second peak comprises the substeps of:
determining a t-statistic between the first peak and the second peak;
assigning a t-statistic confidence interval related to an F-statistic;
comparing the t-statistic confidence interval against a pre-determined F-statistic parameter; and
based on the step of comparing the t-statistic confidence interval against a pre-determined F-statistic parameter, characterizing the first peak and the second peak as related or unrelated.

10. A method for processing chromatographic peaks in chromatographic systems as set forth in claim 9, wherein the step of comparing the variance of the first peak with the variance of the second peak comprises the substeps of:
determining a F-statistic between the first peak and the second peak;
assigning a F-statistic confidence interval related to a t-statistic;
comparing the F-statistic confidence interval against a pre-determined t-statistic parameter;
based on the step of comparing the F-statistic confidence interval against a pre-determined F-statistic parameter, characterizing the first peak and the second peak as related or unrelated.

11. A method for processing chromatographic peaks in chromatographic systems as set forth in claim 9, wherein the chromatographic system includes memory having an F-statistic look-up table and wherein the step of determining an F-statistic includes the step of looking-up the F-statistic on the look-up table.

12. A method for processing chromatographic peaks in chromatographic systems as set forth in claim 11, wherein the F-statistic look-up table includes pre-determined F-statistic values that are calculated using singular value decomposition and stored within memory of the system.

13. A method for processing chromatographic peaks in chromatographic systems as set forth in claim 9, wherein the first peak is a first probability distributions of ions and the second peak is a second probability distributions of ions.

14. A method for processing chromatographic peaks in chromatographic systems as set forth in claim 9, wherein the comparing step and the classifying step are executed by processing modules.

* * * * *